(12) United States Patent
Lussier et al.

(10) Patent No.: US 11,958,550 B2
(45) Date of Patent: Apr. 16, 2024

(54) TRACK SYSTEM FOR TRACTION OF A VEHICLE

(71) Applicant: Camso Inc., Magog (CA)

(72) Inventors: Alain Lussier, St-Francois-Xavier de Brompton (CA); Frederic Couture, Sherbrooke (CA); Etienne Poulin, Sherbrooke (CA)

(73) Assignee: Camso Inc., Magog (CA)

( * ) Notice: Subject to any disclaimer, the term of this patent is extended or adjusted under 35 U.S.C. 154(b) by 549 days.

(21) Appl. No.: 16/639,417

(22) PCT Filed: Aug. 16, 2018

(86) PCT No.: PCT/CA2018/050995
§ 371 (c)(1),
(2) Date: Feb. 14, 2020

(87) PCT Pub. No.: WO2019/033214
PCT Pub. Date: Feb. 21, 2019

(65) Prior Publication Data
US 2021/0129927 A1    May 6, 2021

Related U.S. Application Data

(60) Provisional application No. 62/546,156, filed on Aug. 16, 2017.

(51) Int. Cl.
*B62D 55/06* (2006.01)
*B62D 55/125* (2006.01)
(Continued)

(52) U.S. Cl.
CPC ........... *B62D 55/06* (2013.01); *B62D 55/125* (2013.01); *B62D 55/14* (2013.01); *B62D 55/244* (2013.01); *B62D 55/305* (2013.01)

(58) Field of Classification Search
CPC ...... B62D 55/06; B62D 55/125; B62D 55/14; B62D 55/244; B62D 55/305; B62D 55/12; B62D 55/13
(Continued)

(56) References Cited

U.S. PATENT DOCUMENTS 1,317,103 A * 9/1919 Rimailho ............. B62D 55/125
180/9.62
2,138,485 A * 11/1938 Faries ....................... B62B 3/06
180/9.42
(Continued)

FOREIGN PATENT DOCUMENTS

| EP | 3668779 | 6/2020 |
| WO | 2014100160 | 6/2014 |
| WO | 2019033214 A1 | 2/2019 |

OTHER PUBLICATIONS

Written Opinion dated Nov. 19, 2018 in connection with International Patent Application No. PCT/CA2018/050995, 6 pages.
(Continued)

*Primary Examiner* — Anne Marie M Boehler
(74) *Attorney, Agent, or Firm* — Hahn Loeser & Parks LLP; Bret A. Hrivnak

(57) ABSTRACT

A track system for traction of a vehicle (e.g., a compact track loader or other construction vehicle) which may be designed to improve ride quality (e.g., reduce vibrations) for an operator and/or enhance other aspects of its performance or that of the vehicle. For example, a track of the track system may be frictionally driven and without transversal rigid parts (e.g., metallic cores). Also, power generation and transmission functions may be implemented by the track system. For instance, a motor and a transmission may be at least mostly contained within the track system.

20 Claims, 12 Drawing Sheets

(51) Int. Cl.
  *B62D 55/14* (2006.01)
  *B62D 55/24* (2006.01)
  *B62D 55/30* (2006.01)
(58) Field of Classification Search
  USPC .......... 305/199, 33; 474/160, 164, 151, 197
  See application file for complete search history.

(56) References Cited

U.S. PATENT DOCUMENTS

| | | | | |
|---|---|---|---|---|
| 2,618,349 | A | | 11/1952 | Ludema |
| 3,382,943 | A | * | 5/1968 | Anderson ............... B62D 55/24 305/152 |
| 3,951,093 | A | * | 4/1976 | Poche ................... B60F 3/0015 440/12.63 |
| 4,102,292 | A | * | 7/1978 | Hunter .................. B60F 3/0007 440/12.63 |
| 4,739,852 | A | * | 4/1988 | Stevens ................ B62D 55/125 180/9.62 |
| 4,986,377 | A | * | 1/1991 | Moriarty ................ B62D 55/06 180/9.1 |
| 5,190,363 | A | | 3/1993 | Brittain et al. |
| 5,279,378 | A | | 1/1994 | Grawey et al. |
| 5,363,937 | A | * | 11/1994 | James ....................... B60L 7/24 180/6.28 |
| 5,373,909 | A | * | 12/1994 | Dow .................. B62D 55/0655 180/9.1 |
| 7,182,414 | B2 | * | 2/2007 | Park ..................... B62D 55/125 305/184 |
| 8,216,020 | B2 | * | 7/2012 | Zimet ................... A63H 17/262 446/470 |
| 9,469,356 | B2 | * | 10/2016 | Gustafson ............. B62D 55/10 |
| 10,994,794 | B2 | * | 5/2021 | Kreis ...................... B60K 17/02 |
| 2001/0025732 | A1 | | 10/2001 | Lykken et al. |
| 2005/0035655 | A1 | | 2/2005 | Becksrom et al. |
| 2006/0103235 | A1 | * | 5/2006 | Dommert ............... B62D 55/08 305/145 |
| 2007/0063583 | A1 | * | 3/2007 | Nuesch .................. B62D 55/24 305/165 |
| 2008/0023233 | A1 | * | 1/2008 | Westergaard .......... B62D 55/06 180/9.1 |
| 2009/0001809 | A1 | * | 1/2009 | Johnson ................. B62D 55/12 305/155 |
| 2012/0001478 | A1 | | 1/2012 | Zuchoski et al. |
| 2012/0242142 | A1 | | 9/2012 | Kautsch et al. |
| 2014/0305717 | A1 | * | 10/2014 | Pawlik ................... B62D 55/06 180/9.1 |
| 2017/0113742 | A1 | | 4/2017 | Tratta et al. |
| 2018/0154959 | A1 | * | 6/2018 | Sugihara ................ B62D 55/24 |
| 2019/0047643 | A1 | * | 2/2019 | Gustafson ............ B62D 55/145 |

OTHER PUBLICATIONS

International Search report dated Nov. 19, 2018 in connection with International Patent Application No. PCT/CA2018/050995, 4 pages.
Extended European Search report dated Apr. 9, 2021, in connection with European Patent Application No. 18846965.4, 10 pages.

* cited by examiner

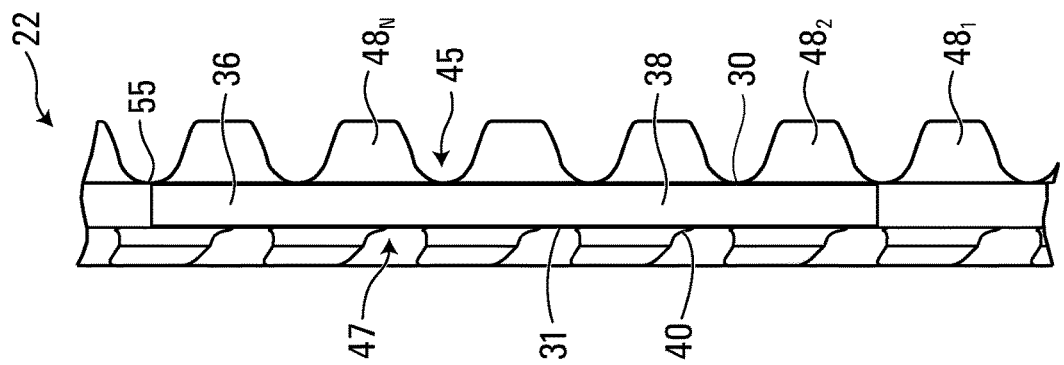
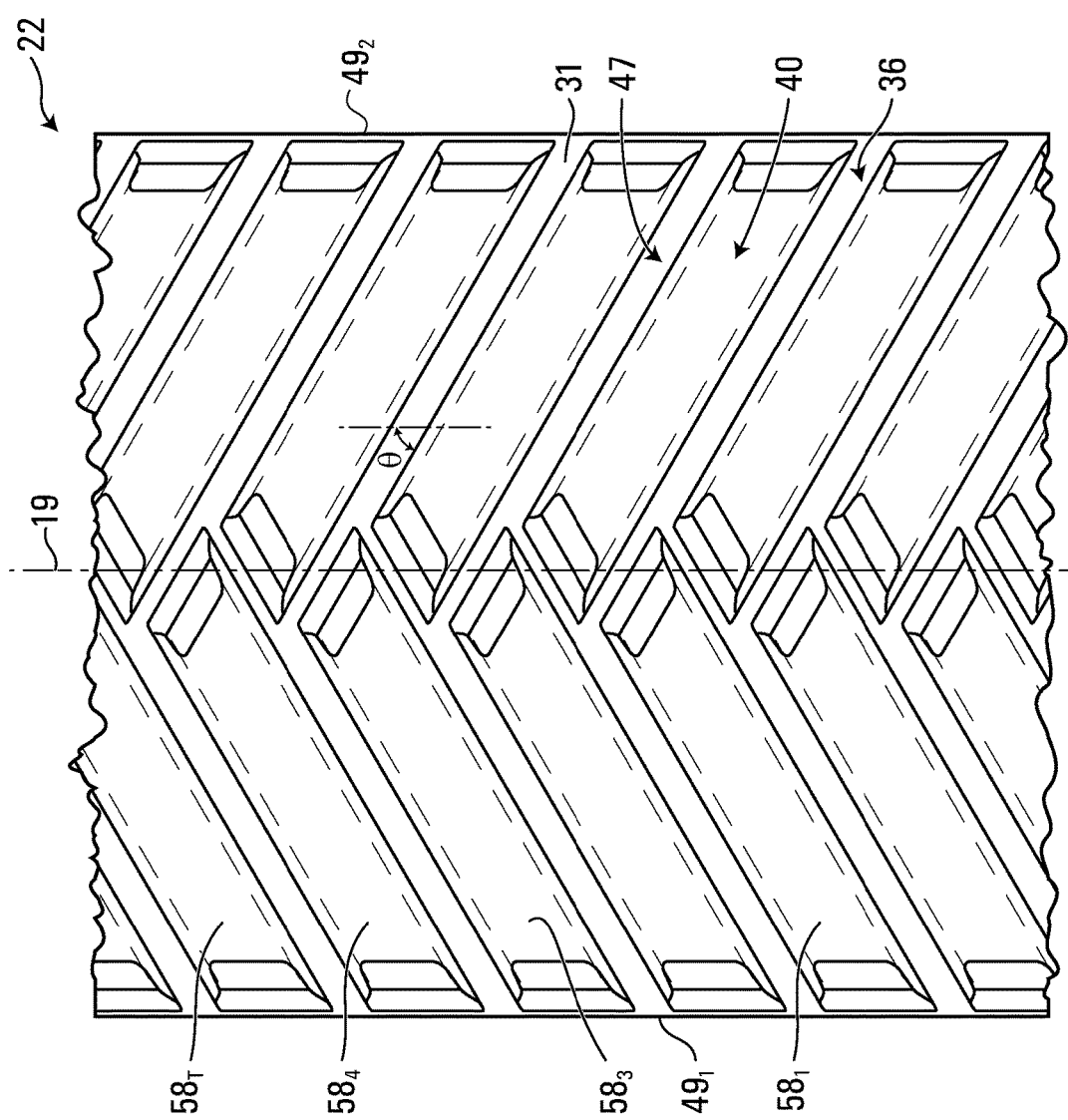

TRACK SYSTEM FOR TRACTION OF A VEHICLE

CROSS-REFERENCE TO RELATED APPLICATION

This application is a national stage of International Application PCT/CA2018/050995 filed on Aug. 16, 2018 and claiming priority from U.S. Provisional Patent Application No. 62/546,156 filed on Aug. 16, 2017, all of which are incorporated by reference herein.

FIELD

This disclosure generally relates to track systems for traction of vehicles, such as construction vehicles and other off-road vehicles.

BACKGROUND

Certain off-road vehicles, including industrial vehicles such as construction vehicles (e.g., loaders, excavators, bulldozers, etc.), agricultural vehicles (e.g., harvesters, combines, tractors, etc.), and forestry vehicles (e.g., feller-bunchers, tree chippers, knuckleboom loaders, etc.), for example, may be equipped with tracks which enhance their traction and floatation on soft, slippery and/or irregular grounds (e.g., soil, mud, sand, ice, snow, etc.) on which they operate.

A track of a track system may comprise elastomeric material (e.g., rubber) and reinforcements embedded in its elastomeric material. For example, in some cases, the track may comprise metallic cores embedded in its elastomeric material and spaced along and extending transversally to its longitudinal direction to impart transverse rigidity to the track and to drive and guide the track, i.e., the track may be a "metal-embedded rubber track" (MERT).

The track's metallic cores, while useful, may cause certain issues. For example, the metallic cores may detrimentally affect ride quality, such as by inducing significant vibrations. The metallic cores may also have an adverse influence on the track's cost.

For these and other reasons, there is a need to improve track systems for traction of vehicles.

SUMMARY

According to various aspects of this disclosure, there is provided a track system for traction of a vehicle (e.g., a compact track loader or other construction vehicle) which may be designed to improve ride quality (e.g., reduce vibrations) for an operator and/or enhance other aspects of its performance or that of the vehicle. For example, a track of the track system may be frictionally driven and without transversal rigid parts (e.g., metallic cores). Also, power generation and transmission functions may be implemented by the track system. For instance, a motor and a transmission may be at least mostly contained within the track system.

For example, in accordance with an aspect of this disclosure, there is provided a track system for traction of a vehicle. The track system comprises a track that comprises a ground-engaging outer side and an inner side opposite to the ground-engaging outer side. The track system also comprises a track-engaging assembly for driving and guiding the track around the track-engaging assembly. The track-engaging assembly comprises a drive wheel for driving the track and an idler wheel. The track system comprises a motor and a transmission disposed between the motor and the drive wheel to transmit power generated by the motor to the drive wheel.

In accordance with another aspect, there is provided a track system for traction of a vehicle. The track system comprises a track that comprises a ground-engaging outer side and an inner side opposite to the ground-engaging outer side. The track system also comprises a track-engaging assembly for driving and guiding the track around the track-engaging assembly. The track-engaging assembly comprises a drive wheel for driving the track and an idler wheel. The track system comprises a motor and a transmission disposed between the motor and the drive wheel to transmit power generated by the motor to the drive wheel. An axis of rotation of the drive wheel is spaced apart from an axis of rotation of an output of the motor. At least a majority of the motor and at least a majority of the transmission are contained within a width of the track.

In accordance with another aspect, there is provided a track system for traction of a vehicle. The track system comprises a track that comprises a ground-engaging outer side and an inner side opposite to the ground-engaging outer side. The track system also comprises a track-engaging assembly for driving and guiding the track around the track-engaging assembly. The track-engaging assembly comprises a drive wheel for driving the track and an idler wheel. The track system comprises a motor and a transmission disposed between the motor and the drive wheel to transmit power generated by the motor to the drive wheel. An axis of rotation of the drive wheel is spaced apart from an axis of rotation of an output of the motor. At least a majority of a dimension of the motor in a widthwise direction of the track system and at least a majority of a dimension of the transmission in the widthwise direction of the track system are contained within a width of the track.

In accordance with another aspect, there is provided a track system for traction of a vehicle. The track system comprises a track that comprises a ground-engaging outer side and an inner side opposite to the ground-engaging outer side. The inner side of the track comprises a friction drive surface. The track system also comprises a track-engaging assembly for driving and guiding the track around the track-engaging assembly. The track-engaging assembly comprises a drive wheel for driving the track. The drive wheel comprises a friction drive surface frictionally engaging the friction drive surface of the track to frictionally drive the track around the track-engaging assembly. The track-engaging assembly also comprises an idler wheel. The track system comprises a motor and a transmission disposed between the motor and the drive wheel to transmit power generated by the motor to the drive wheel.

In accordance with another aspect, there is provided a track system for traction of a compact track loader. The track system comprises a track that comprises a ground-engaging outer side and an inner side opposite to the ground-engaging outer side. The inner side of the track comprises a friction drive surface. The track system comprises a track-engaging assembly for driving and guiding the track around the track-engaging assembly. The track-engaging assembly comprises a drive wheel for driving the track. The drive wheel comprises a friction drive surface frictionally engaging the friction drive surface of the track to frictionally drive the track around the track-engaging assembly. The track-engaging assembly also comprises an idler wheel.

In accordance with another aspect, there is provided a track system for traction of a compact track loader. The track system comprises a track that comprises a ground-engaging outer side and an inner side opposite to the ground-engaging outer side. The track system also comprises a track-engaging assembly for driving and guiding the track around the track-engaging assembly. The track-engaging assembly comprises a drive wheel for driving the track and an idler wheel. The track is free of metallic cores embedded in elastomeric material of the track and extending transversally to a longitudinal direction of the track.

In accordance with another aspect, there is provided a track for traction of a compact track loader. The track comprises a ground-engaging outer side and an inner side opposite to the ground-engaging outer side. The track is free of metallic cores embedded in elastomeric material of the track and extending transversally to a longitudinal direction of the track.

These and other aspects of this disclosure will now become apparent to those of ordinary skill in the art upon review of the following description of embodiments in conjunction with the accompanying drawings.

BRIEF DESCRIPTION OF THE DRAWINGS

A detailed description of embodiments is provided below, by way of example only, with reference to the accompanying drawings, in which:

FIGS. 7 to 10 show a track of the track system;

It is to be expressly understood that the description and drawings are only for the purpose of illustrating certain embodiments and are an aid for understanding. They are not intended to be limitative.

DETAILED DESCRIPTION OF EMBODIMENTS

Figure 1:
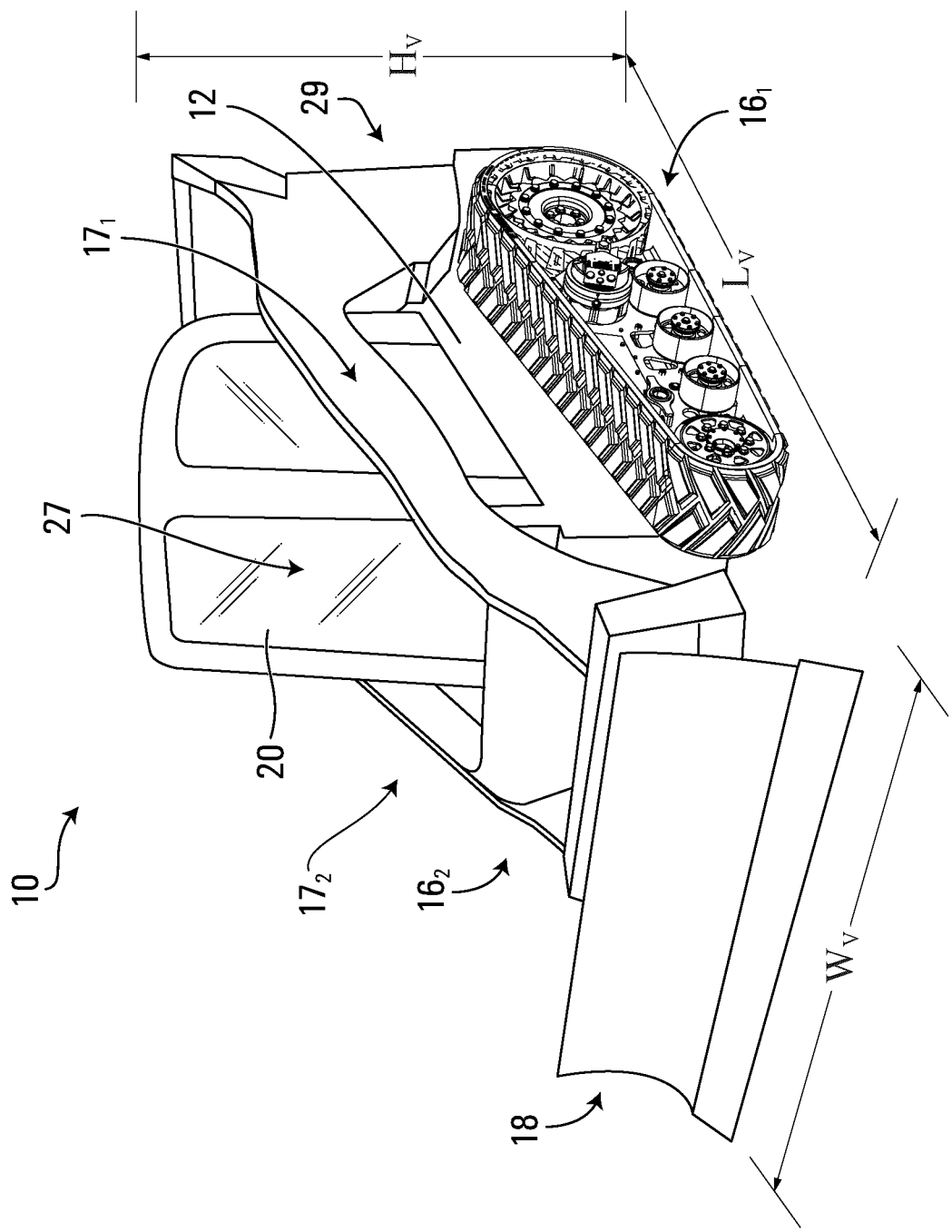
FIG. 1 shows an example of a vehicle comprising track systems in accordance with an embodiment.
Figure 2:
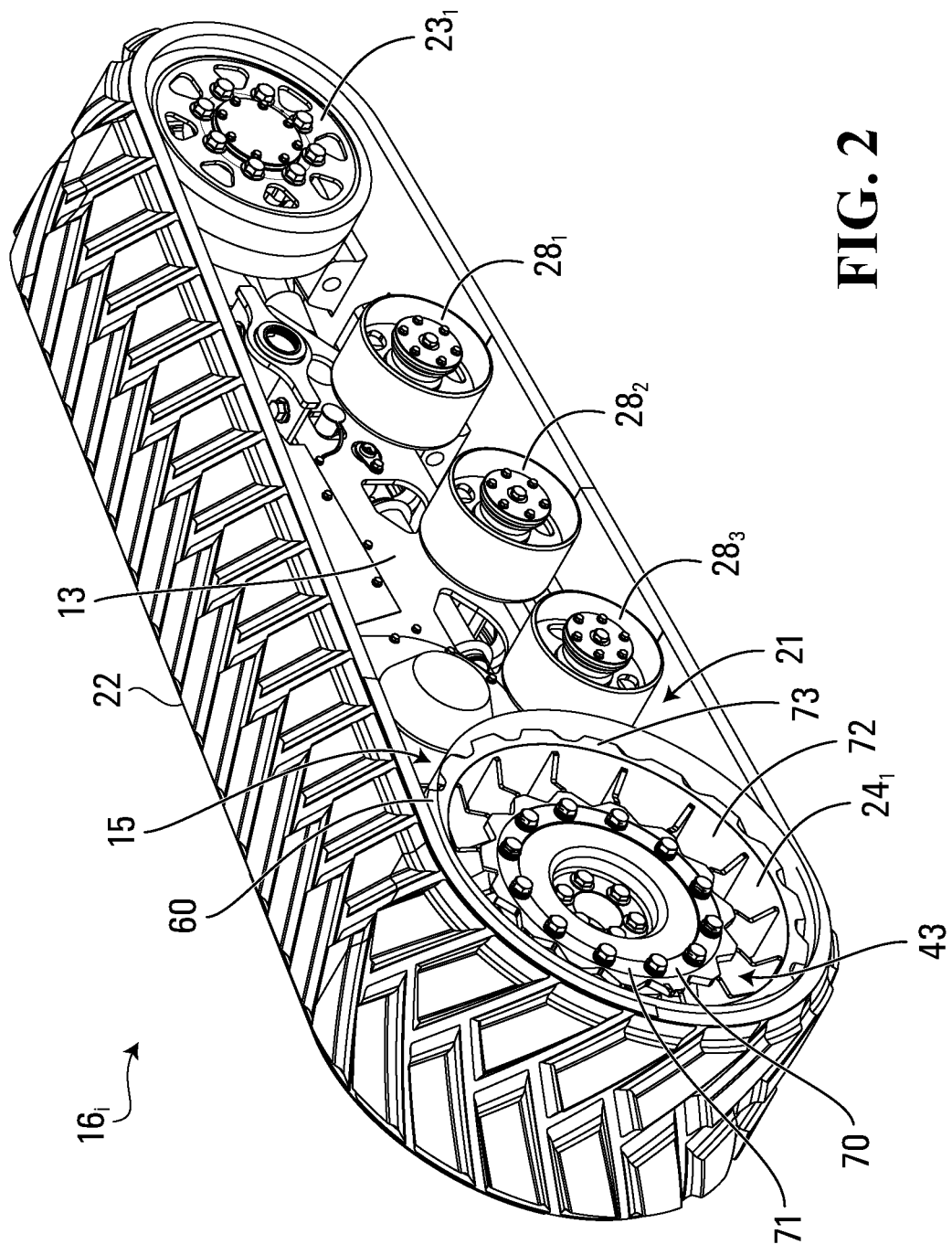
FIGS. 2 to 6 show a track system of the vehicle.
Figure 3:
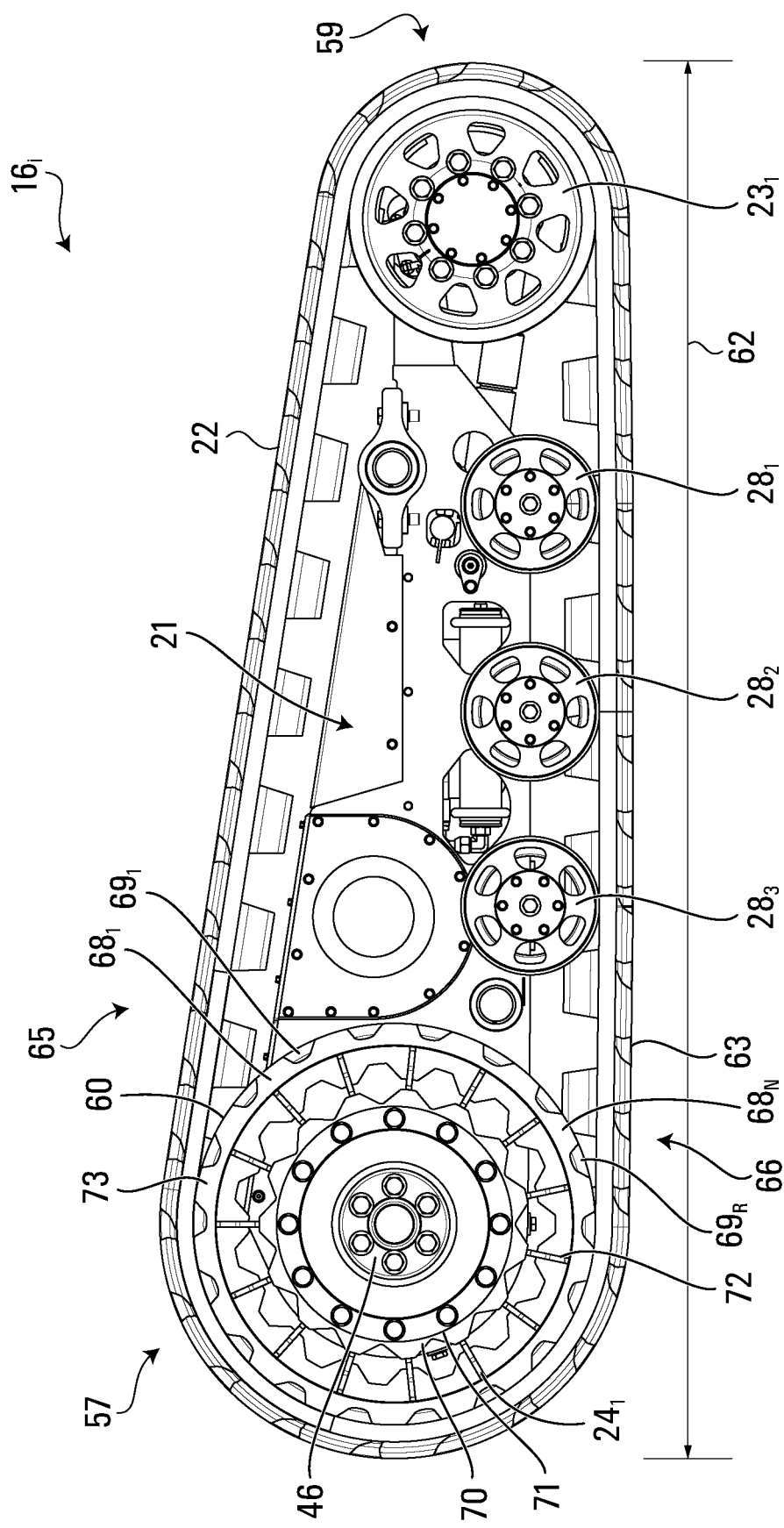
Figure 4:
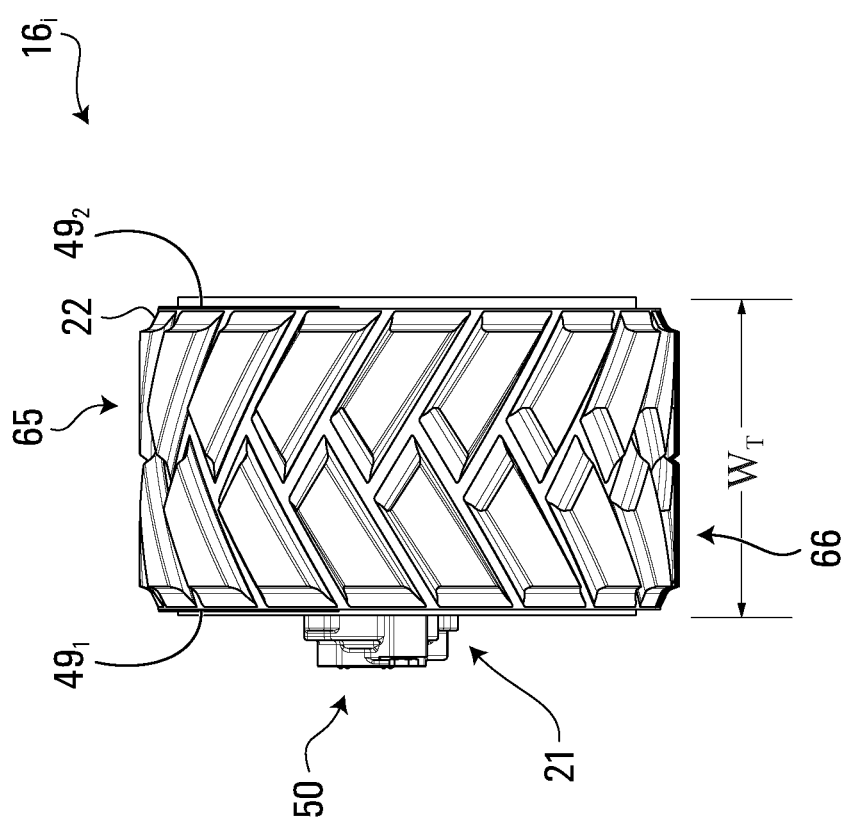
Figure 5:
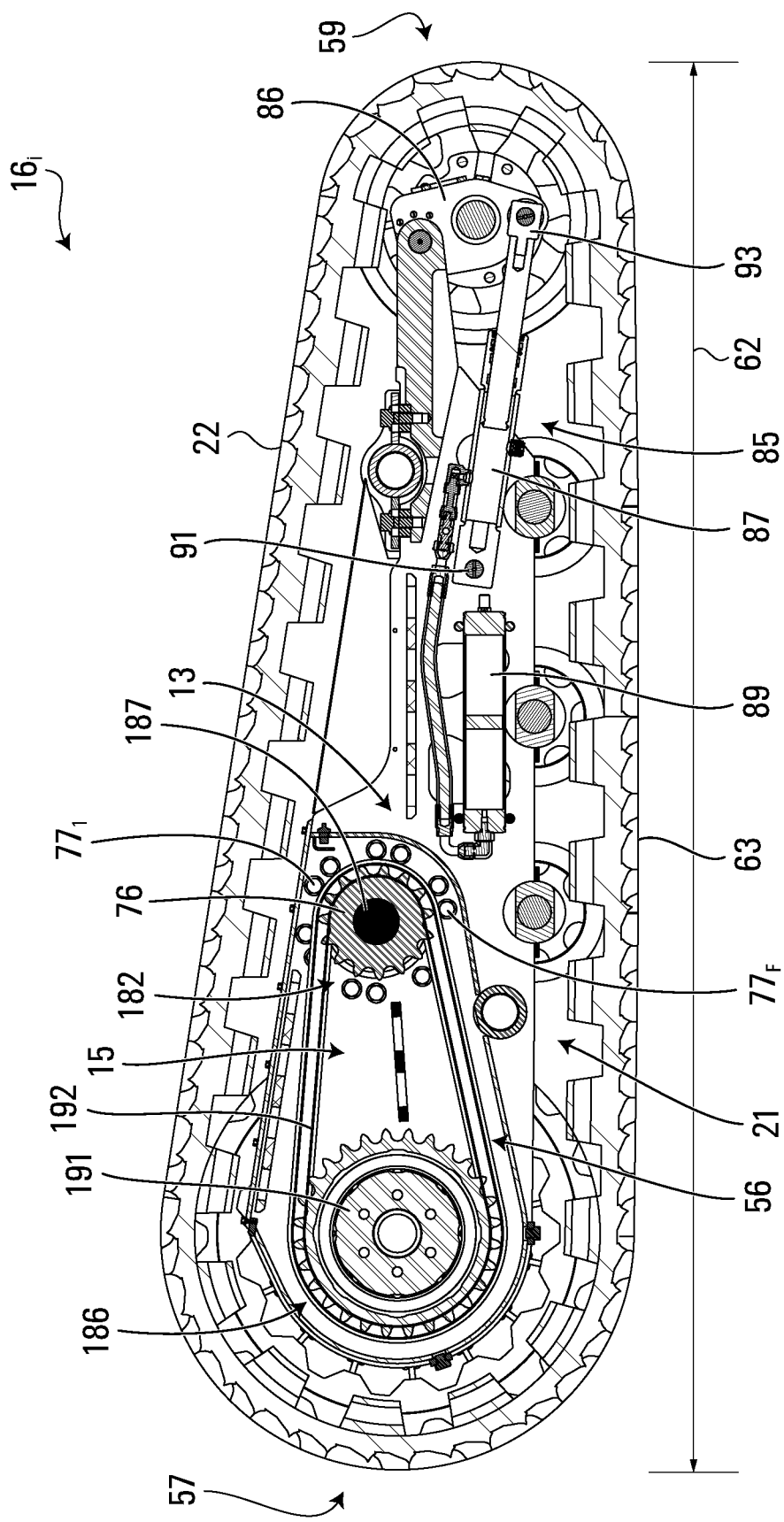

FIG. 1 shows an example of a vehicle 10 comprising track systems $16_1$, $16_2$ in accordance with an embodiment. In this embodiment, the vehicle 10 is a heavy-duty work vehicle for performing construction, agricultural, or other industrial work or military work. More particularly, in this embodiment, the vehicle 10 is a construction vehicle. Specifically, in this example, the construction vehicle 10 is a compact track loader. The compact track loader 10 comprises a frame 12, a powertrain 15, and an operator cabin 20 for an operator to move the vehicle 10 on the ground to perform construction work using a work implement 18.

As further discussed later, in this embodiment, the track systems $16_1$, $16_2$ may be designed to improve ride quality (e.g., reduce vibrations) for the operator and/or enhance other aspects of their performance or that of the compact track loader 10. Notably, in this embodiment, tracks of the track systems $16_1$, $16_2$ may be frictionally driven and without transversal rigid parts (e.g., metallic cores). Also, power generation and transmission functions of the powertrain 15 may be implemented by the track systems $16_1$, $16_2$. For instance, motors and transmissions of the powertrain 15 may be at least mostly (i.e., mostly or entirely) contained within the track systems $16_1$, $16_2$. This may help to make the compact track loader 10 more compact, facilitate installation of the track systems $16_1$, $16_2$ on the vehicle 10, reduce production costs, improve energy efficiency, reduce loading on the powertrain 15 from the ground, and/or provide other benefits.

The operator cabin 20 comprises a user interface 27 that allow the operator to interact with the compact track loader 10, such as to steer the vehicle 10 on the ground, use the work implement 18, and control other aspects of the vehicle 10. For example, the user interface 27 comprises an accelerator, a brake control, and a steering device that are used by the operator to control motion of the vehicle 10 on the ground, as well as controls to operate the work implement 18. The user interface 27 may also comprise an instrument panel (e.g., a dashboard) which provides indicators (e.g., a speedometer indicator, a tachometer indicator, etc.) to convey information to the operator.

The work implement 18 is operable to perform work. In this embodiment, the work implement 18 comprises a bucket for moving soil, debris or other material. The compact track loader 10 comprises support arms $17_1$, $17_2$ carrying the work implement 18 and mounted to a rear part 29 of the frame 12 so that they extend forwardly pass the operator cabin 20. In other embodiments, the work implement 18 may comprise a dozer blade, a backhoe, a fork, a grapple, a scraper pan, an auger, a saw, a ripper, a material-handling arm, or any other type of work implement.

The compact track loader 10 is relatively small and compact. For example, a length $L_V$ of the compact track loader 10 without the work implement 18 is relatively small in relation of the operator cabin 20. For instance, in some embodiments, the operator cabin 20 may occupy at least one-third, in some cases at least half, and in some cases even more of the length $L_V$ of the compact track loader 10 without the work implement 18.

As an example, in some embodiments, the length $L_V$ of the compact track loader 10 without the work implement 18 may be no more than 160 inches, in some cases no more than 150 inches, in some cases no more than 140 inches, in some cases no more than 130 inches, in some cases no more than 120 inches, in some cases no more than 110 inches, in some cases no more than 100 inches, and in some cases even less. Also, a height $H_V$ of the compact track loader 10 may be no more than 100 inches, in some cases no more than 90 inches, in some cases no more than 80 inches, in some cases no more than 70 inches and in some cases even less. Also, a width $W_V$ of the compact track loader 10 may be no more than 80 inches, in some cases no more than 72 inches, in some cases no more than 60 inches, in some cases no more than 48 inches, in some cases no more than 36 inches and in some cases even less. Also, a weight of the compact track loader 10 may be no more than 14000 lbs, in some cases no more than 12000 lbs, in some cases no more than 10000 lbs, in some cases no more than 8000 lbs, in some cases no more than 6000 lbs, and in some cases even less. For instance, in some embodiments, the length $L_V$ of the compact track loader 10 may be about 125 inches, the height $H_V$ of the compact track loader 10 may be about 80 inches, the width $W_V$ of the compact track loader 10 may be about 70 inches, and the compact track loader 10 may weigh around 9000 lbs.

The track systems $16_1$, $16_2$ engage the ground to propel the vehicle 10. With additional reference to FIGS. 2 to 6, each track system $16_i$ comprises a track-engaging assembly and a track 22 disposed around the track-engaging assembly 21. In this embodiment, the track-engaging assembly 21 comprises a plurality of wheels which, in this example, includes drive wheels $24_1$, $24_2$ and a plurality of idler wheels that includes front (i.e., leading) idler wheels $23_1$, $23_2$, and roller wheels $28_1$-$28_6$. In addition, in this embodiment, the track system $16_i$ comprises a motor 50 and a transmission 56 for generating and transmitting power to move the track 22, as further discussed later. The track system $16_i$ also comprises a frame 13 which supports various components of the track system $16_i$, including the wheels $24_1$, $24_2$, $23_1$, $23_2$, $28_1$-$28_6$, the motor 50, and the transmission 56.

The track system $16_i$ has a longitudinal direction and a first longitudinal end 57 and a second longitudinal end 59 that define a length of the track system $16_i$ along a longitudinal axis 62 that defines the longitudinal direction of the track system $16_i$. The track system $16_i$ has a widthwise direction and a width that is defined by a width $W_T$ of the track 22. The track system $16_i$ also has a heightwise direction that is normal to its longitudinal and widthwise directions.

In this embodiment, the vehicle 10 may be steered by operating the track systems $16_1$, $16_2$ differently, such as by moving their tracks 22 at different speeds and/or in different directions.

The track 22 engages the ground to provide traction to the vehicle 10. A length of the track 22 allows the track 22 to be mounted around the track-engaging assembly 21. In view of its closed configuration without ends that allows it to be disposed and moved around the track-engaging assembly 21, the track 22 can be referred to as an "endless" track. With additional reference to FIGS. 7 to 10, the track 22 comprises an inner side 45, a ground-engaging outer side 47, and lateral edges $49_1$, $49_2$. The inner side 45 faces the wheels $24_1$, $24_2$, $23_1$, $23_2$, $28_1$-$28_6$, while the ground-engaging outer side 47 engages the ground. A top run 65 of the track 22 extends between the longitudinal ends 57, 59 of the track system $16_i$ and over the wheels $24_1$, $24_2$, $23_1$, $23_2$, $28_1$-$28_6$, whereas a bottom run 66 of the track 22 extends between the longitudinal ends 57, 59 of the track system $16_i$ and under the wheels $24_1$, $24_2$, $23_1$, $23_2$, $28_1$-$28_6$. The bottom run 66 of the track 22 defines an area of contact 63 of the track 22 with the ground which generates traction and bears a majority of a load on the track system $16_i$, and which will be referred to as a "contact patch" of the track 22 with the ground. The track 22 has a longitudinal axis 19 which defines a longitudinal direction of the track 22 (i.e., a direction generally parallel to its longitudinal axis) and transversal directions of the track 22 (i.e., directions transverse to its longitudinal axis), including a widthwise direction of the track 22 (i.e., a lateral direction generally perpendicular to its longitudinal axis). The track 22 has a thicknesswise direction normal to its longitudinal and widthwise directions.

The track 22 is elastomeric, i.e., comprises elastomeric material, to be flexible around the track-engaging assembly 21. The elastomeric material of the track 22 can include any polymeric material with suitable elasticity. In this embodiment, the elastomeric material of the track 22 includes rubber. Various rubber compounds may be used and, in some cases, different rubber compounds may be present in different areas of the track 22. In other embodiments, the elastomeric material of the track 22 may include another elastomer in addition to or instead of rubber (e.g., polyurethane elastomer, an elastomeric composite). The track 22 may also include any other suitable material, such as, for instance, a thermoplastic material (e.g. ultra-high-molecular-weight polyethylene (UHMW)).

More particularly, the track 22 comprises an endless body 36 underlying its inner side 45 and ground-engaging outer side 47. In view of its underlying nature, the body 36 will be referred to as a "carcass". The carcass 36 is elastomeric in that it comprises elastomeric material 38 which allows the carcass 36 to elastically change in shape and thus the track 22 to flex as it is in motion around the track-engaging assembly 21.

In this embodiment, the carcass 36 comprises a plurality of reinforcements embedded in its elastomeric material 38. These reinforcements can take on various forms.

For example, in this embodiment, the carcass 36 comprises a layer of reinforcing cables $37_1$-$37_M$ that are adjacent to one another and extend generally in the longitudinal direction of the track 22 to enhance strength in tension of the track 22 along its longitudinal direction. In this case, each of the reinforcing cables $37_1$-$37_M$ is a cord including a plurality of strands (e.g., textile fibers or metallic wires). In other cases, each of the reinforcing cables $37_1$-$37_M$ may be another type of cable and may be made of any material suitably flexible along the cable's longitudinal axis (e.g., fibers or wires of metal, plastic or composite material).

As another example, in this embodiment, the carcass 36 comprises a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 22 to have a reinforcing effect in a transversal direction of the track 22. For instance, the reinforcing fabric 43 may comprise a ply of reinforcing woven fibers (e.g., nylon fibers or other synthetic fibers).

The carcass 36 may be molded into shape in a molding process during which the elastomeric material 38 is cured. For example, in this embodiment, a mold may be used to consolidate layers of elastomer providing the elastomeric material 38 of the carcass 36, the reinforcing cables $37_1$-$37_M$ and the layer of reinforcing fabric 43.

The inner side 45 of the track 22 comprises an inner surface 55 of the carcass 36. In this embodiment, the inner surface 55 comprises a friction drive surface 30 that frictionally engages the drive wheels $24_1$, $24_2$ such that, as the drive wheels $24_1$, $24_2$ rotate, friction between the friction drive surface 30 and the drive wheels $24_1$, $24_2$ imparts motion of the track 22 around the wheels $24_1$, $24_2$, $23_1$, $23_2$, $28_1$-$28_6$, to move the vehicle 10 on the ground. The track 22 is tensioned around the wheels $24_1$, $24_2$, $23_1$, $23_2$, $28_1$-$28_6$ to create sufficient friction between the friction drive surface 30 and the drive wheels $24_1$, $24_2$ to drive the track 22.

Also, in this embodiment, the inner side 45 of the track 22 comprises a plurality of wheel-contacting projections $48_1$-$48_N$ that project from the inner surface 55 and are positioned to contact at least some of the wheels $24_1$, $24_2$, $23_1$, $23_2$, $28_1$-$28_6$ to do at least one of guiding the track 22 and driving (i.e., imparting motion to) the track 22. The wheel-contacting projections $48_1$-$48_N$ can be referred to as "wheel-contacting lugs". Furthermore, since each of them is used to do at least one of guiding the track 22 and driving the track 22, the wheel-contacting lugs $48_1$-$48_N$ can be referred to as "guide/drive projections" or "guide/drive lugs". In some examples of implementation, a guide/drive lug $48_i$ may interact with the drive wheel $24_1$, $24_2$ to drive the track 22, in which case the guide/drive lug $48_i$ is a drive lug. In other examples of implementation, a guide/drive lug $48_i$ may interact with the front idler wheels $23_1$, $23_2$ and/or the roller wheels $28_1$-$28_6$ to guide the track 22 to maintain proper track alignment and prevent de-tracking without being used to drive the track 22, in which case the guide/drive lug $48_i$ is a guide lug. In yet other examples of implementation, a guide/drive lug $48_i$ may both (i) interact with the drive wheel $24_1$, $24_2$ to drive the track and (ii) interact with the front idler wheels $26_1$, $26_2$ and/or the roller wheels $28_1$-$28_6$ to guide the track 22 to maintain proper track alignment and prevent de-tracking, in which case the guide/drive lug $48_i$ is both a guide lug and a drive lug.

In this embodiment, the guide/drive lugs $48_1$-$48_N$ interact with the front idler wheels $23_1$, $23_2$ and/or the roller wheels $28_1$-$28_6$ to guide the track 22 to maintain proper track alignment and prevent de-tracking but are not used to drive the track 22, such that they are guide lugs to guide the track 22.

The guide lugs $48_1$-$48_N$ may be arranged in any suitable way. In this example of implementation, the guide lugs $48_1$-$48_N$ are arranged in a single row disposed longitudinally along the inner side 45 of the track 22. The guide lugs $48_1$-$48_N$ may be arranged in other manners in other examples of implementation (e.g., in a plurality of rows that are spaced apart along the widthwise direction of the track 22).

In this embodiment, each guide lug $48_i$ is an elastomeric guide lug in that it comprises elastomeric material 67. In this case, the elastomeric material 67 constitutes at least a majority (i.e., a majority or an entirety) of the guide lug $48_i$. The elastomeric material 67 can be any polymeric material with suitable elasticity. More particularly, in this embodiment, the elastomeric material 67 includes rubber. Various rubber compounds may be used and, in some cases, different rubber compounds may be present in different areas of the guide lug $48_i$. In other embodiments, the elastomeric material 67 may include another elastomer in addition to or instead of rubber (e.g., polyurethane elastomer).

The guide lugs $48_1$-$48_N$ may be provided on the inner side 45 of the track 22 in various ways. For example, in this embodiment, the guide lugs $48_1$-$48_N$ are provided on the inner side 45 of the track 22 by being molded with the carcass 36.

The ground-engaging outer side 47 of the track 22 comprises a ground-engaging outer surface 31 of the carcass 36 and a tread pattern 40 to enhance traction on the ground. The tread pattern 40 comprises a plurality of traction projections $58_1$-$58_T$ projecting from the ground-engaging outer surface 31, spaced apart in the longitudinal direction of the track 22 and engaging the ground to enhance traction. The traction projections $58_1$-$58_T$ may be referred to as "tread projections" or "traction lugs".

The traction lugs $58_1$-$58_T$ may have any suitable shape. In this embodiment, each of the traction lugs $58_1$-$58_T$ has an elongated shape and is angled, i.e., defines an oblique angle θ (i.e., an angle that is not a right angle or a multiple of a right angle), relative to the longitudinal direction of the track 22. The traction lugs $58_1$-$58_T$ may have various other shapes in other examples (e.g., curved shapes, shapes with straight parts and curved parts, etc.).

In this embodiment, each traction lug $58_i$ is an elastomeric traction lug in that it comprises elastomeric material 41. In this case, the elastomeric material 41 constitutes at least a majority (i.e., a majority or an entirety) of the traction lug $58_i$. The elastomeric material 41 can be any polymeric material with suitable elasticity. More particularly, in this embodiment, the elastomeric material 41 includes rubber. Various rubber compounds may be used and, in some cases, different rubber compounds may be present in different areas of the traction lug $58_i$. In other embodiments, the elastomeric material 41 may include another elastomer in addition to or instead of rubber (e.g., polyurethane elastomer).

The traction lugs $58_1$-$58_T$ may be provided on the ground-engaging outer side 47 of the track 22 in various ways. For example, in this embodiment, the traction lugs $58_1$-$58_T$ are provided on the ground-engaging outer side 47 of the track 22 by being molded with the carcass 36.

Figure 11:
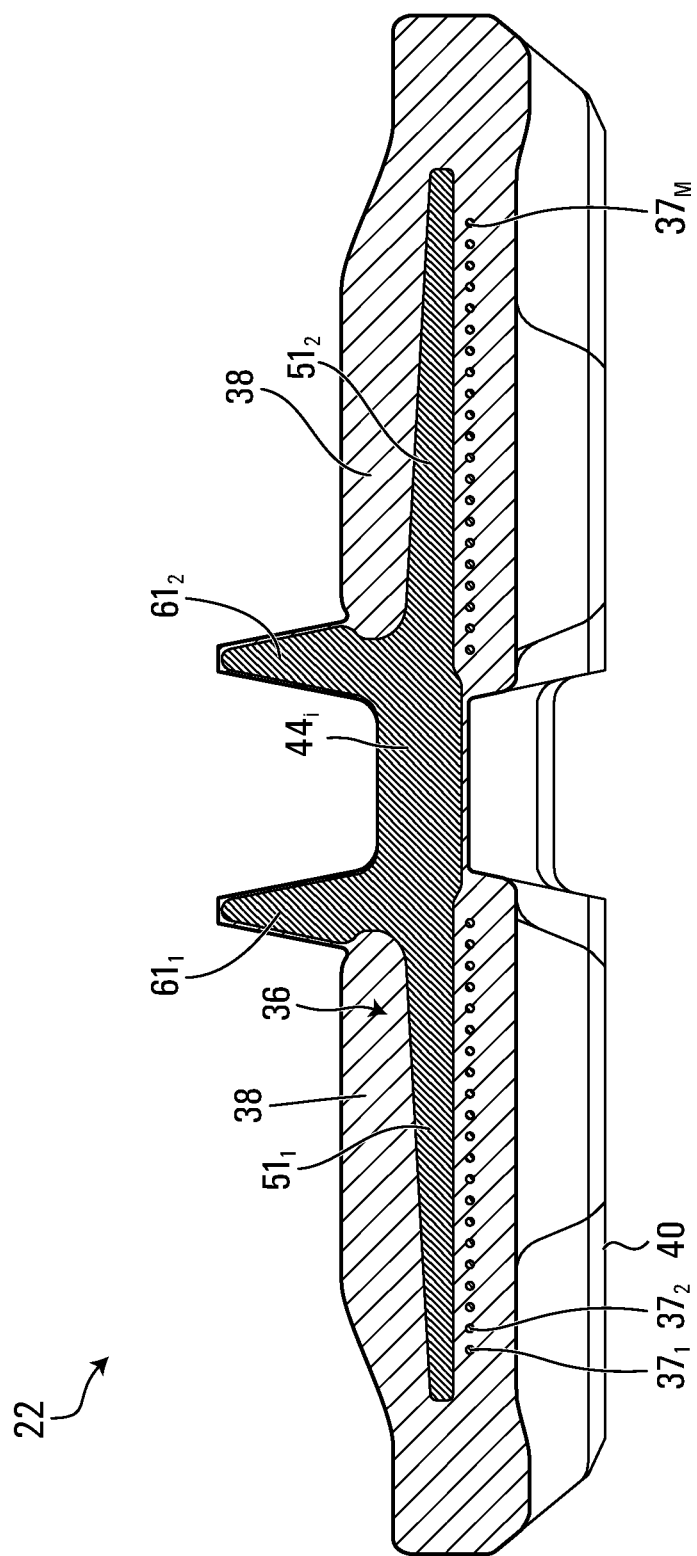
FIG. 11 shows an example of a variant in which the track would comprise rigid cores embedded in its elastomeric material.

In this embodiment, the track 22 is free of (i.e., without) rigid cores (e.g., metallic cores) embedded in its elastomeric material and extending transversally to its longitudinal direction to impart transversal rigidity to the track 22 and interact with the wheels $24_1$, $24_2$, $23_1$, $23_2$, $28_1$-$28_6$ for at least one of guiding the track 22 and driving the track 22. That is, in this embodiment, the track 22 is not a "metal-embedded rubber track" (MERT). FIG. 11 shows an example of a variant in which the track 22 would comprise rigid (e.g.,metallic) cores $44_1$-$44_N$ embedded in its elastomeric material and spaced along and extending transversally to its longitudinal direction to impart transverse rigidity to the track 22 and help to guide and/or drive the track 22. Each rigid core $44_i$, comprises a pair of wings $51_1$, $51_2$ (i.e., extensions) and a pair of wheel-engaging projections $61_1$, $61_2$ that project on the inner side 45 of the track 22 and are disposed between the wings $51_1$, $51_2$.

By being free of rigid cores such as the rigid cores $44_1$-$44_N$, in this embodiment, the track 22 may help to improve the ride quality for the operator of the compact track loader 10. Notably, this absence of rigid cores may reduce shocks or other vibrations that could otherwise be experienced if the track 22 had such rigid cores.

The track 22 may be constructed in various other manners in other embodiments. For example, in some embodiments, the track 22 may have drive voids (e.g., recesses or holes) that interact with the drive wheels $24_1$, $24_2$ in order to cause the track 22 to be driven (e.g., in which case the guide/drive lugs $48_1$-$48_N$ may be used both guide the track 22 and drive the track 22), and/or the ground-engaging outer side 47 of the track 22 may comprise various patterns of traction lugs.

The drive wheels $24_1$, $24_2$ are rotatable by power derived from the powertrain 15 to drive the track 22. In this example, the drive wheels $24_1$, $24_2$ are rotatable by power derived from the motor 50 of the track system $16_i$.

In this embodiment, each drive wheel $24_x$ comprises a friction drive surface 60 that frictionally engages the friction drive surface 30 of the track 22 to frictionally drive the track 22, i.e., such that, as the drive wheel $24_x$ rotates, friction between the friction drive surface 30 of the track 22 and the friction drive surface 60 of the drive wheel $24_x$ imparts motion of the track 22 around the wheels $24_1$, $24_2$, $23_1$, $23_2$, $28_1$-$28_6$ to move the vehicle 10 on the ground.

More particularly, in this embodiment, the drive wheel $24_x$ comprises a hub 46 and a body 43 extending radially from the hub 46 and including the friction drive surface 60 of the drive wheel $24_x$. In this example, the body 43 of the drive wheel $24_x$ comprises a central member 70 and a peripheral member 72 that is disposed radially outwardly of the central material 70 and includes the friction drive surface 60. The central member 70 provides strength and structural integrity of the body 43 of the drive wheel $24_x$, while the peripheral member 72 enhances frictional engagement with the track 22. Notably, in this embodiment, a coefficient of friction between a material 73 of the peripheral member 72 and the rubber of the track 22 is greater than a coefficient of friction between a material 71 of the central member 70 and the rubber of the track 22. For instance, in this embodiment, the material 73 of the peripheral member 72 may be elastomeric (e.g., rubber) and the material 71 of the central member 70 may be metallic (e.g., steel). Also, in this embodiment, the peripheral member 72 comprises friction drive projections $68_1$-$68_N$ that are spaced apart by recesses $69_1$-$69_R$ and include respective parts of the the friction drive surface 60 of the drive wheel $24_x$. The drive wheel $24_x$ may be implemented in any other way in other embodiments. For instance, in other embodiments, the central member 70 of the drive wheel $24_x$ may be polymeric (e.g. thermoplastic or thermosetting material, fiber-reinforced polymeric material, etc.).

In this embodiment, the drive wheels $24_1$, $24_2$ are spaced apart in the widthwise direction of the track system $16_i$ to define a space 33 therebetween. In this example, at least part of the transmission 56 and at least part of the frame 13 are positioned laterally between the drive wheels $24_1$, $24_2$ in the space 33 therebetween. The drive wheel member $24_1$, which is positioned between an outboard one of the lateral edges $49_1$, $49_2$ of the track 22 (i.e., that is farthest from a centerline of the vehicle 10) and portions of the transmission 56 and the frame 13 in the space 33, can thus be viewed as an "outboard" drive wheel, while the drive wheel $24_2$, which is positioned between an inboard one of the lateral edges $49_1$, $49_2$ of the track 22 (i.e., that is nearest to the centerline of the vehicle 10) and portions of the transmission 56 and the frame 13, can thus be viewed as an "inboard" drive wheel.

In this case, the drive wheels $24_1$, $24_2$ are separate from one another. Also, in this case, the drive wheels $24_1$, $24_2$ are larger in diameter than the front idler wheels $23_1$, $23_2$. This may help to frictionally drive the track 22. In other cases, the drive wheels $24_1$, $24_2$ may constitute a unitary (i.e., one-piece) drive wheel, such as by being integrally formed (e.g., molded) with one another or by being directly fastened to one another (e.g., by one or more bolts, screws or other mechanical fasteners, by welding, etc.), and/or may not be larger in diameter than the front idler wheels $23_1$, $23_2$.

Each of the drive wheels $24_1$, $24_2$ may be implemented in various other ways in other embodiments. For example, in other embodiments, each of the drive wheels $24_1$, $24_2$ may be a drive sprocket comprising a plurality of drive members (e.g., teeth or bars) spaced apart circumferentially to engage the guide/drive lugs $48_1$-$48_N$ and/or drive voids of the track 22 in order to drive the track 22 (e.g., a "positive drive" arrangement).

The idler wheels $23_1$, $23_2$, $28_1$-$28_6$ are not driven by power supplied by the powertrain 15, but are rather used to do at least one of supporting part of the weight of the vehicle 10 on the ground via the track 22, guiding the track 22 as it is driven by the drive wheels $24_1$, $24_2$, and tensioning the track 22. More particularly, in this embodiment, the front idler wheels $23_1$, $23_2$ maintain the track 22 in tension and help to support part of the weight of the vehicle 10 on the ground via the track 22. The roller wheels $28_1$-$28_6$ roll on the inner side 45 of the track 22 along the bottom run 66 of the track 22 to apply the bottom run 66 on the ground.

The motor 50 is configured for generating power to cause the drive wheels $24_1$, $24_2$ to move the track 22. For example, in this embodiment, the motor 50 is a hydraulic motor. In other embodiments, the motor 50 may be an electric motor. In yet other embodiments, the motor 50 may be a pneumatic motor. In yet other embodiments, the motor 50 may be an internal combustion engine or any other type of motor. The motor 50 comprises a body 74 and an output 76. The body 74 of the motor 50 is connectable to a control system of the vehicle 10 that allows the motor 50 to be controlled (e.g., including in response to input by the operator at the user interface 27).

In this embodiment, an axis of rotation 194 of the output 76 of the motor 50 is transversal to the longitudinal direction of the track system $16_i$. More particularly, in this embodiment, the axis of rotation 194 of the output 76 of the motor 50 is perpendicular to the longitudinal direction of the track system $16_i$, namely substantially parallel to the widthwise direction of the track system $16_i$. This may help the transmission 56 to transmit power to the drive wheels $24_1$, $24_2$ more efficiently.

The motor 50 is supported by the frame 13 of the track system $16_i$. For instance, the motor 50 may be affixed to the frame 13 of the track system $16_i$ in any suitable way. In this embodiment, the motor 50 is fastened to the frame 13 of the track system $16_i$ by fasteners $77_1$-$77_F$. In other embodiments, the motor 50 may be welded to the frame 13 of the track system $16_i$.

The transmission 56 is disposed between the motor 50 and the drive wheels $24_1$, $24_2$ to transmit power from the motor 50 to the drive wheels $24_1$, $24_2$. In this embodiment, the transmission 56 is also configured to perform a speed conversion such that a rotational speed of each of the drive wheels $24_1$, $24_2$ is different from a rotational speed of the output 76 of the motor 50.

More particularly, in this embodiment, the transmission 56 comprises a first portion 182 connected to the motor 50 and a second portion 186 connected to the drive wheels $24_1$, $24_2$. The first portion 182 of the transmission 56 has an axis 189 substantially coaxial with the axis of rotation 194 of the output 76 of the motor 50, while the second portion 186 of the transmission 56 has an axis 190 substantially coaxial with an axis of rotation 133 of each drive wheel $24_x$. In this example, the axis 190 of the second portion 186 of the transmission 76 is spaced apart from the axis 189 of the first portion 182 of the transmission 76 in the longitudinal direction of the track system $16_i$ and in the heightwise direction of the track system $16_i$. Thus, in this example, the axis of rotation 133 of the drive wheel $24_x$ is spaced apart from the axis of rotation 194 of the output 76 of the motor 50 in the longitudinal direction of the track system $16_i$ and in the heightwise direction of the track system $16_i$. In other examples, the axis of rotation 133 of the drive wheel $24_x$ may be aligned with the axis of rotation 194 of the output 76 of the motor 50 in the longitudinal direction of the track system $16_i$ and/or in the heightwise direction of the track system $16_i$.

In this embodiment, the first portion 182 of the transmission 56 comprises an input transmission wheel 187 connected to the output 76 of the motor 50 and the second portion 186 of the transmission 56 comprises an output transmission wheel 191 connected to each drive wheel $24_x$. In this example, the transmission wheels 187, 191 are interconnected by an intermediate transmission member 192. In this case, the intermediate transmission member 192 comprises an endless transmission link disposed around the transmission wheels 187, 191. For example, in some embodiments, each of the transmission wheels 187, 191 may be a sprocket gear and the intermediate transmission member 192 may include a transmission chain. As another example, in some embodiments, each of the transmission wheels 187, 191 may be a pulley and the intermediate transmission member 192 may be a transmission belt.

In this example of implementation, the output transmission wheel 191 is larger than the input transmission wheel 187 such that the output transmission wheel 191 rotates slower than the input transmission wheel 187. In turn, this causes the drive wheels $24_1$, $24_2$ to rotate slower than the output 76 of the motor 50. A transmission ratio T can be selected so as to provide a desired speed conversion. The transmission ratio T can be expressed as a ratio $\omega_o/\omega_i$ of an output rotational speed $\omega_o$ of the transmission 56, which in this case is the rotational speed of each drive wheel $24_x$, to an input rotational speed $\omega_i$ of the transmission 56, which in this case is the rotational speed of the output 76 of the motor 50. For example, in some embodiments, the transmission ratio T of the transmission 56 may be no more than 0.8, in some case no more than 0.7, in some cases no more than 0.6, in some cases no more than 0.5, in some cases no more than 0.4, in some cases no more than 0.3, and in some cases even less. The transmission ratio T may have any other suitable value in other embodiments.

The transmission 56 may be implemented in any other suitable way in other embodiments. For example, in other embodiments, the transmission 76 may comprise a gearbox, in which case the first transmission wheel 187 may be an input gear, the output transmission wheel 191 may be an output gear, and the intermediate transmission member 192 may comprise an idler gear. As another example, in other embodiments, the transmission 76 may comprise a torque converter, and/or another transmission component, or may comprise another type of transmission (e.g., a continuously variable transmission (CVT), a hydrostatic or hydrodynamic transmission, an electric transmission, etc.). Also, in other embodiments, the output transmission wheel 191 may be smaller than the input transmission wheel 187 such that the output transmission wheel 191 rotates faster than the input transmission wheel 187, causing the drive wheels $24_1$, $24_2$ to rotate faster than the output 76 of the motor 50. i.e., the transmission ratio T of the transmission 56 may be greater than one. Furthermore, in some embodiments, the transmission 56 may implement a set of two or more available transmission ratios from which a particular transmission ratio is selected and applied at any point in time (e.g., an automatic transmission).

In this example, spacing the axis of rotation 133 of each drive wheel $24_x$ from the axis of rotation 194 of the output 76 of the motor 50 may help to allow the track 22 to be frictionally driven. For instance, in some embodiments, this may facilitate use of a bearing for the drive wheel $24_x$ that is suitable for forces exerted on the drive wheel $24_x$ to properly tension the track 22 to create sufficient friction between the track 22 and the drive wheel $24_x$ to drive the track 22.

In this embodiment, each of the motor 50 and the transmission 56 is at least mostly (i.e., mostly or entirely) contained within the track system $16_i$. That is, at least a majority (i.e., a majority or an entirety) of the motor 50 and at least a majority of the transmission 56 are contained within the track system $16_i$, i.e., within the width $W_T$ of the track 22 and thus do not protrude beyond the track 22 in the widthwise direction of the track system $16_i$ (i.e., are disposed between the lateral edges $49_1$, $49_2$ of the track 22). Each of the motor 50 and the transmission 56 is therefore at least mostly contained within an envelope of the track system $16_i$ that is defined by the track 22. This may help to make the compact track loader 10 more compact and/or facilitate installation of the track systems $16_1$, $16_2$ on the vehicle 10.

More particularly, in this embodiment, at least a majority of a dimension $D_M$ of the motor 50 in the widthwise direction of the track system $16_i$ is contained within the track system $16_i$, i.e., within the width $W_T$ of the track 22 and thus does not protrude beyond the track 22 in the widthwise direction of the track system $16_i$. For example, in some embodiments, at least 60%, in some cases at least 70%, in some cases at least 80%, in some cases at least 90%, and in some cases an entirety of the dimension $D_M$ of the motor 50 in the widthwise direction of the track system $16_i$ is contained within the track system $16_i$.

Figure 6:
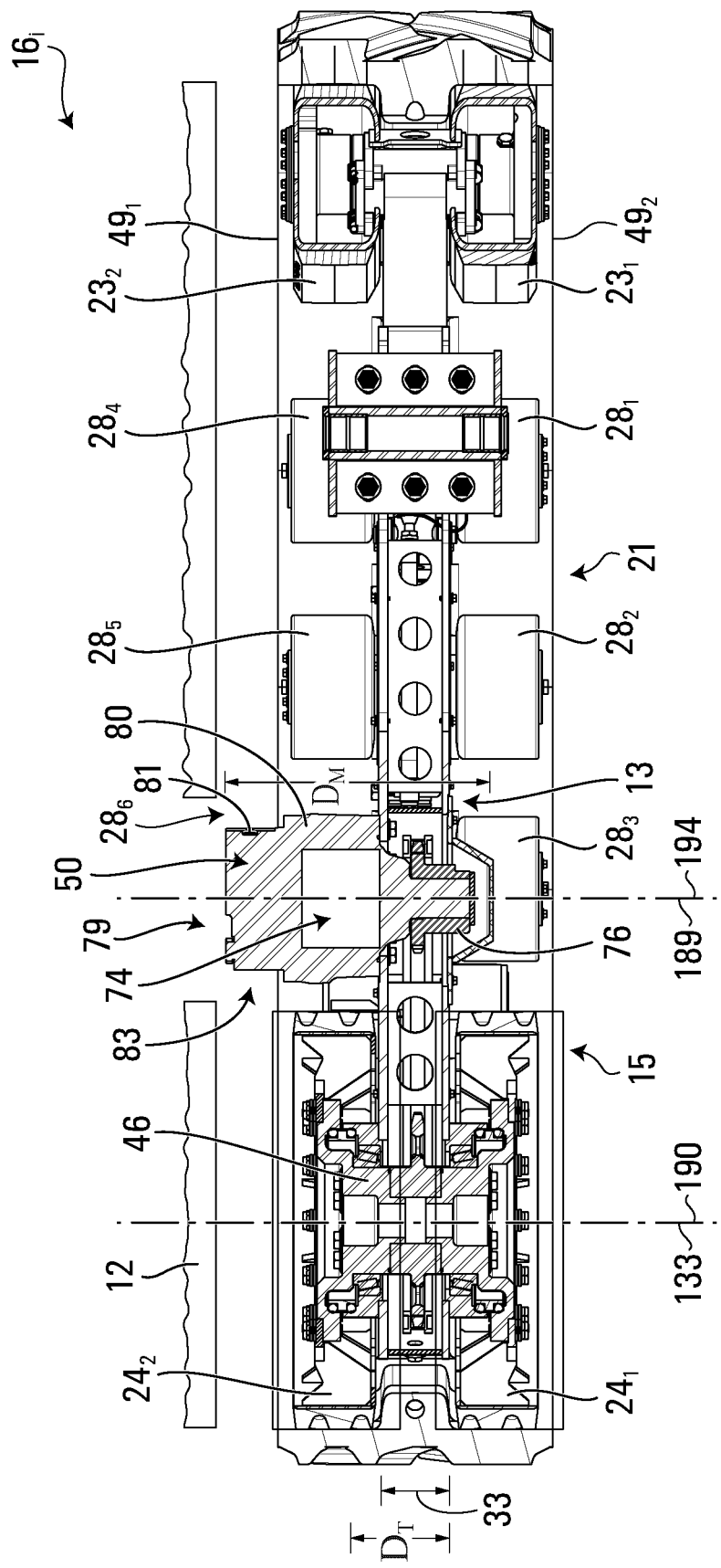
Figure 9:
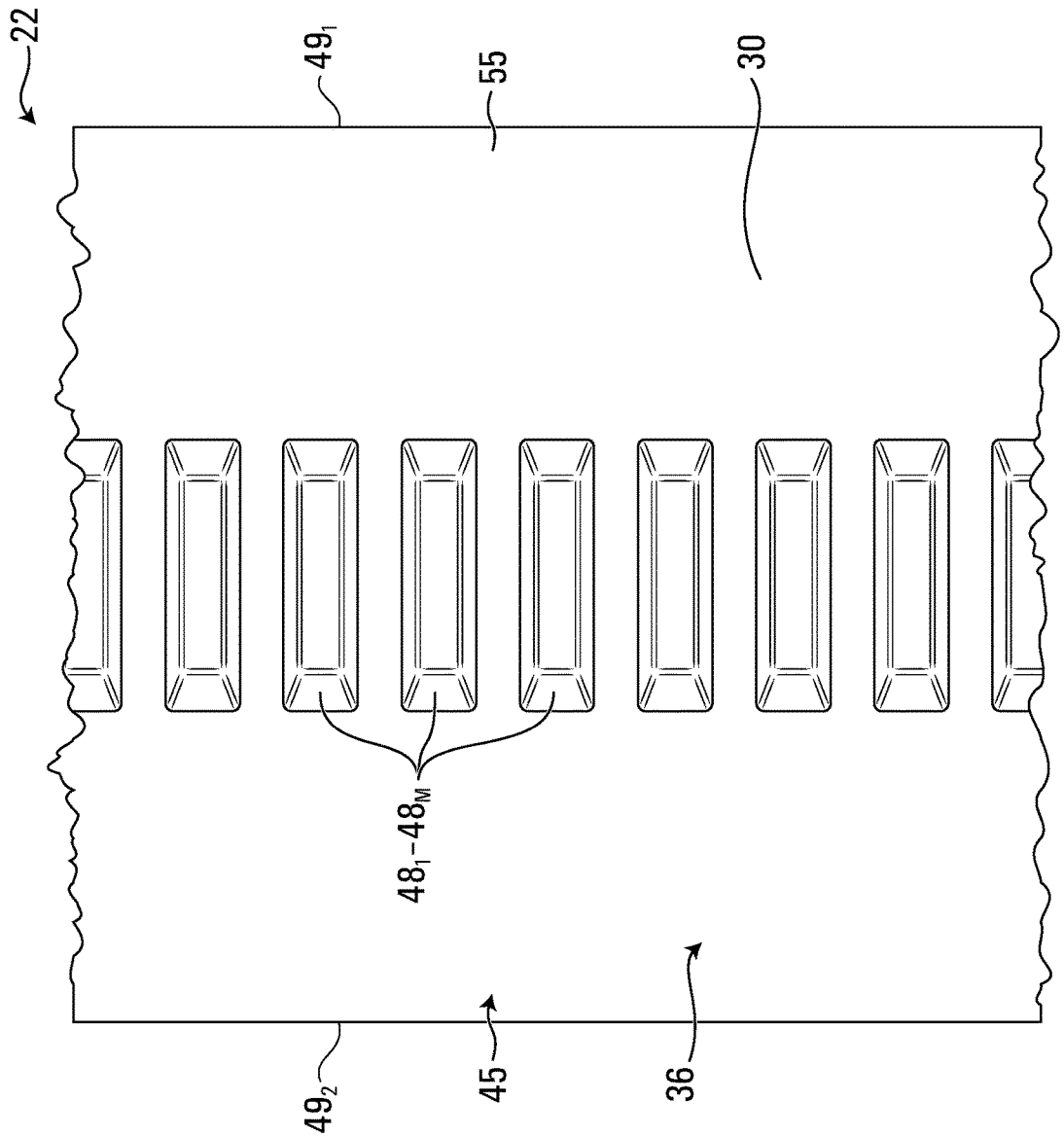
Figure 10:
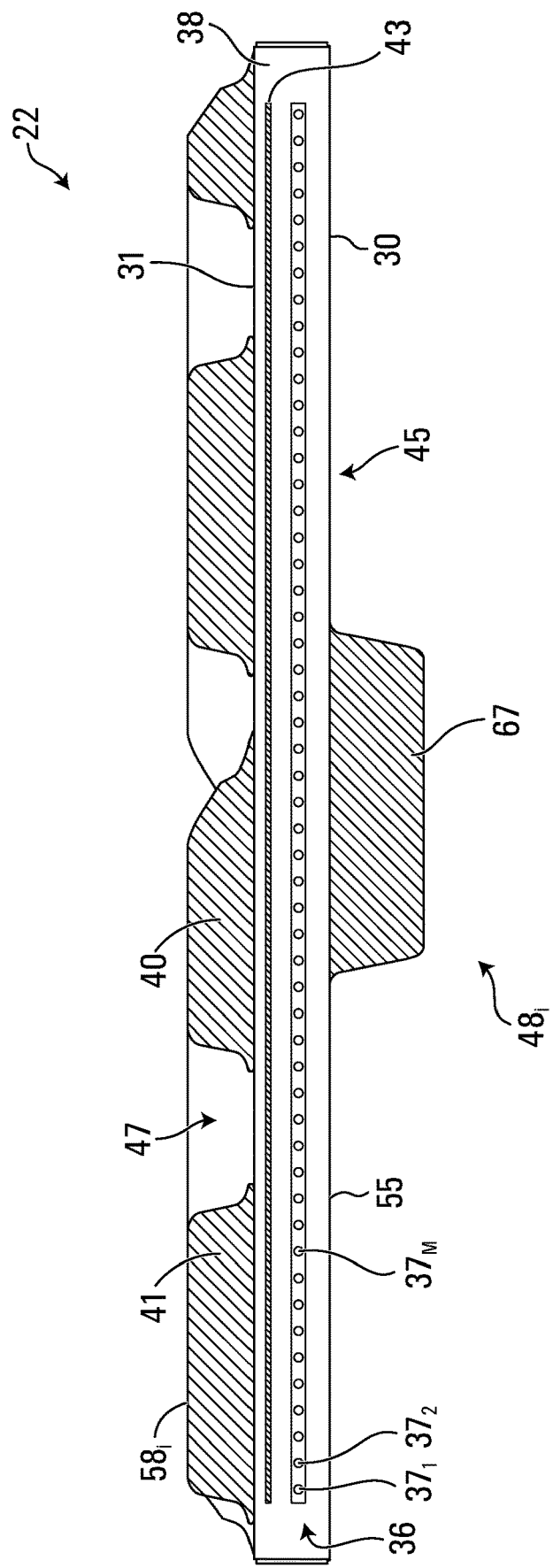

In this example of implementation, a major portion 80 of the motor 50 is contained within the track system $16_i$, i.e., within the width $W_T$ of the track 22 and thus does not protrude beyond the track 22 in the widthwise direction of the track system $16_i$, while a minor portion 81 of the motor 50 is not contained within the track system $16_i$, i.e., within the width $W_T$ of the track 22 and thus protrudes beyond the track 22 in the widthwise direction of the track system $16_i$. In this case, the minor portion 81 of the motor 50 comprises a brake 83 to slow down or stop the motor 50. In some embodiments, as shown in FIG. 6, the frame 12 of the vehicle 10 may comprise a void 79 (e.g., an opening or a recess) to receive the minor portion 81 of the motor 50 in order to allow the track system $16_i$ to be even closer to the frame 12 of the vehicle 10.

Also, in this embodiment, at least a majority of a dimension $D_T$ of the transmission 56 in the widthwise direction of the track system $16_i$ is contained within the track system $16_i$, i.e., within the width $W_T$ of the track 22 and thus does not protrude beyond the track 22 in the widthwise direction of the track system $16_i$. For example, in some embodiments, at least 60%, in some cases at least 70%, in some cases at least 80%, in some cases at least 90%, and in some cases an entirety of the dimension $D_T$ of the transmission 56 in the widthwise direction of the track system $16_i$ is contained within the track system $16_i$.

In this example of implementation, the entirety of the transmission 56 is contained within the track system $16_i$, i.e., within the width $W_T$ of the track 22 and thus does not protrude beyond the track 22 in the widthwise direction of the track system $16_i$. Notably, in this case, the transmission 56 is disposed centrally in the widthwise direction of the track system $16_i$ and extends in the space 33 between the drive wheels $24_1$, $24_2$.

Since, in this embodiment, each of the motor 50 and the transmission 56 is at least mostly contained within it, the track system $16_i$ may be installed on the vehicle 10 as a unit. That is, the track system $16_i$, including the motor 50 and the transmission 56, may be provided and mounted to the vehicle 10 as a unit in which the motor 50 and the transmission 56 are at least mostly contained within the envelope of the track system $16_i$ that is defined by the track 22. This is in contrast to conventional track systems in which motors and/or transmissions are already part of vehicles before these conventional track systems are installed on these vehicles.

In this embodiment, the track system $16_i$ also comprises a tensioner 85 for maintaining the track 22 in tension. Notably, in this example, the tension of the track 22 is sufficient to allow the track 22 to be frictionally driven. The tensioner 85 is configured to urge respective ones of the wheels $24_1$, $24_2$, $23_1$, $23_2$, $28_1$-$28_6$ away from one another to tension the track 22. In this case, the tensioner 85 is configured to urge the front idler wheels $23_1$, $23_2$ away from the drive wheels $24_1$, $24_2$ to tension the track 22.

More particularly, in this embodiment, the tensioner 85 is a fluidic (i.e., fluid-based) tensioner, i.e., a hydraulic or pneumatic tensioner, which comprises a piston-cylinder mechanism 87 connected to a fluidic accumulator 89. The fluidic accumulator 89 is configured to receive a fluid (e.g., liquid, gas) and, in this embodiment, is integrated with the track system $16_i$. In particular, the fluidic accumulator 89 is contained within the envelope defined by the track 22 such that the fluidic accumulator 89 is disposed between the lateral edges $49_1$, $49_2$ of the track 22.

In this case, the piston-cylinder mechanism 87 has a first end portion 91 connected to the frame 13 and a second end portion 93 connected to a cam plate 86 connected to the front idler wheels $23_1$, $23_2$. A piston of the piston-cylinder mechanism 87 is movable relative to a cylinder of the piston-cylinder mechanism 87 between an extended position and a retracted position. Pressure of a fluid inside the piston-cylinder mechanism 87 urges the piston towards its extended position. As a result, the piston pushes on the cam plate 86 which biases the front idler wheels $23_1$, $23_2$ away from the drive wheels $24_1$, $24_2$, thereby maintaining the track 22 in tension.

The tensioner 85 may be implemented in various other ways in other embodiments. For example, in some embodiments, the tensioner 85 may comprise a coil spring or any other elastic object that deforms under stress and recovers its original configuration when the stress is released. In other embodiments, the tensioner 85 may be an electric tensioner that comprises an electric actuator (e.g. a single electric actuator or a combination of electric actuators) coupled with a load cell. In such case, the load cell may provide a measurement of tension load applied to the track 22 by the electric tensioner 85.

Although it is configured in a certain way in embodiments considered above, the track system $16_i$ may be configured in various other ways in other embodiments.

Figure 12:
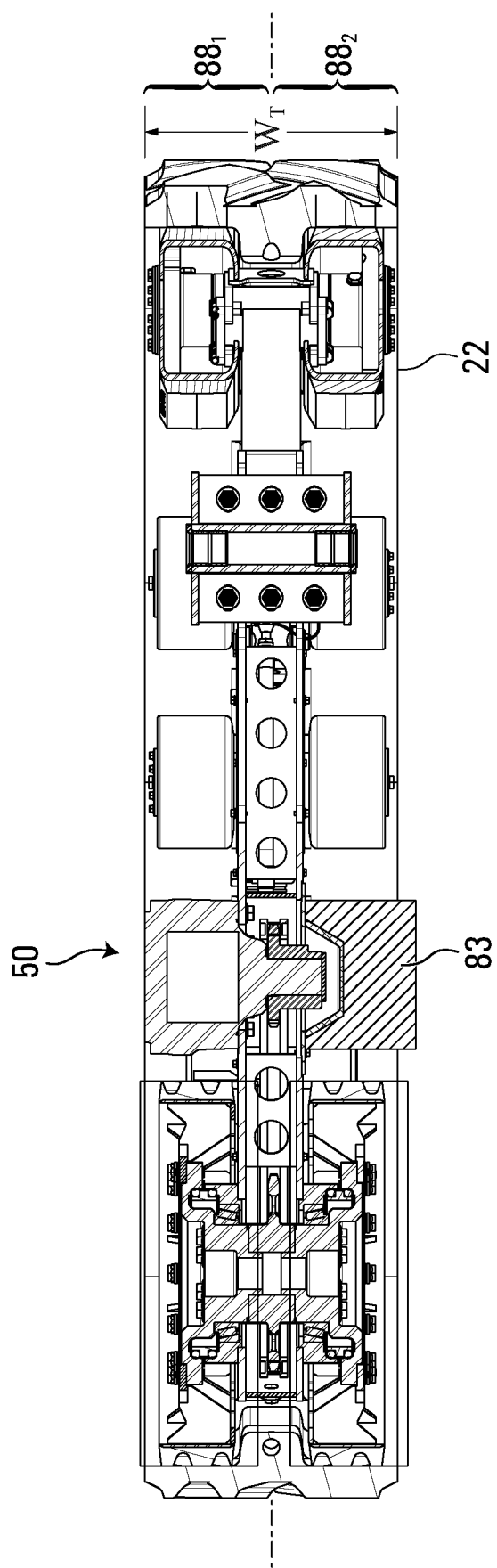
FIG. 12 shows an example of a variant in which an entirety of a motor is contained within the track system.

For example, in some embodiments, as shown in FIG. 12, the entirety of the motor 50 may be contained within the track system $16_i$, i.e., within the width $W_T$ of the track 22 and thus does not protrude beyond the track 22 in the widthwise direction of the track system $16_i$. In this embodiment, instead of being disposed in an inboard lateral half $88_1$ of the track system $16_i$ (i.e., a half of the track system $16_i$ in the widthwise direction of the track system $16_i$ that is closest to the centerline of the vehicle 10) as in embodiments considered above, the brake 83 for the motor 50 is disposed in an outboard lateral half $88_2$ of the track system $16_i$ (i.e., a half of the track system $16_i$ in the widthwise direction of the track system $16_i$ that is farthest from the centerline of the vehicle 10).

As another example, in some embodiments, the track-engaging assembly 21 of the track system $16_i$ may include any number of drive wheels like the drive wheels $24_1$, $24_2$. For instance, in some embodiments, there may be only one drive wheel, like the drive wheels $24_1$, $24_2$. In other embodiments, there may be more than two drive wheels, like the drive wheels $24_1$, $24_2$. For instance, in some embodiments, some of the idler wheels $23_1$, $23_2$, and/or roller wheels $28_1$-$28_6$ may also be connected directly or indirectly to a part of the transmission 56 and thus may act as drive wheels and may contribute to driving the track 22.

As yet another example, in some embodiments, the track system $16_i$ may include any number of motors such as the motor 50. For instance, in some embodiments, the track system $16_i$ may comprise a combination of different types of motor (e.g., a hydraulic motor, an electric motor and/or an internal combustion engine), such as the motor 50 and another motor of a different type.

Figure 13:
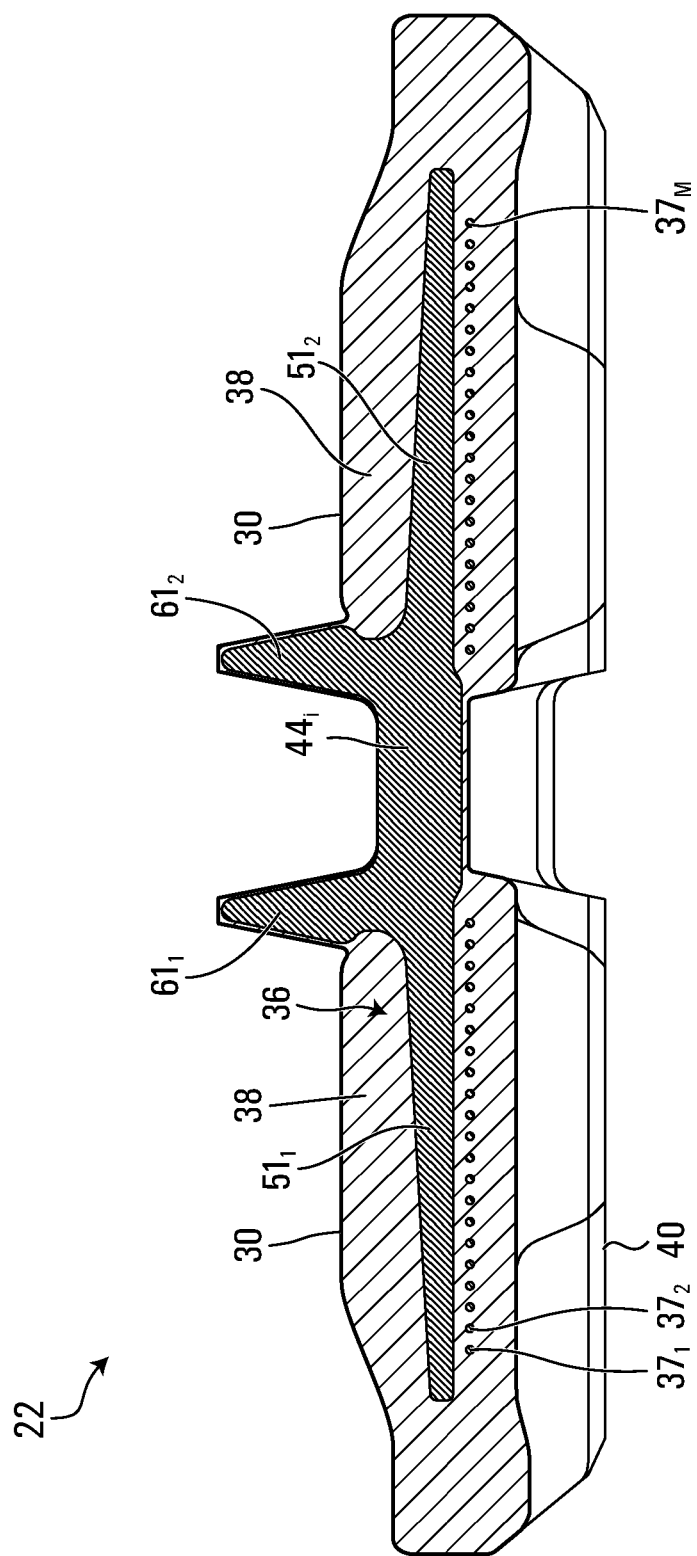
FIG. 13 shows an example of a variant of the track in which the track would be frictionally driven and comprise rigid cores embedded in its elastomeric material.

As yet another example, in some embodiments, as shown in FIG. 13, the track 22 may include the rigid cores $44_1$-$44_N$ discussed above to interact with the wheels $23_1$, $23_2$, $28_1$-$28_6$ for guiding the track 22 but be frictionally driven by the drive wheels $24_1$, $24_2$. That is, the track 22 may comprise the rigid cores $44_1$-$44_N$ and the friction drive surface 30 that frictionally engages the drive wheels $24_1$, $24_2$ such that, as the drive wheels $24_1$, $24_2$ rotate, friction between the friction drive surface 30 and the drive wheels $24_1$, $24_2$ imparts motion of the track 22 around the wheels $24_1$, $24_2$, $23_1$, $23_2$, $28_1$-$28_6$, to move the vehicle 10 on the ground. In this case, the wheel-engaging projections $61_1$, $61_2$ of the rigid cores $44_1$-$44_N$ that project on the inner side 45 of the track 22 may be used to guide the track 22 to maintain proper track alignment and prevent de-tracking while the track 22 is frictionally driven by the drive wheels $24_1$, $24_2$.

While in the embodiment considered above the vehicle 10 is a compact track loader, in other embodiments, the vehicle 10 may be any other type of construction vehicle (e.g., a bulldozer, a backhoe loader, an excavator, etc.) for performing construction work. In other examples, the vehicle 10 may be any other suitable type of vehicle (e.g., an agricultural vehicle, a forestry vehicle, an all-terrain vehicle (ATV)) or any other vehicle operable off paved roads. Although operable off paved roads, the vehicle 10 may also be operable on paved roads in some cases. Also, while in the embodiment considered above the vehicle 10 is driven by a human operator in the vehicle 10, in other embodiments, the vehicle 10 may be an unmanned ground vehicle (e.g., a teleoperated or autonomous unmanned ground vehicle).

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for purposes of description, but should not be limiting. Various modifications and enhancements will become apparent to those of ordinary skill in the art.

The invention claimed is:

1. A track system for traction of a vehicle, the track system comprising:
   a track comprising a carcass, a ground-engaging outer side, and an inner side opposite to the ground-engaging outer side;
   a track-engaging assembly for driving and guiding the track around the track-engaging assembly, the track-engaging assembly comprising:
   a drive wheel in frictional engagement with an inner surface of the carcass for driving the track; and
   an idler wheel,
      wherein a bottom run of the track extends between the drive wheel and the idler wheel;
   a motor; and
   a transmission disposed between the motor and the drive wheel to transmit power generated by the motor to the drive wheel,
   wherein the drive wheel is a first drive wheel; the track-engaging assembly comprises a second drive wheel for driving the track; the first drive wheel and the second drive wheel are spaced apart in a widthwise direction of the track system to define a space therebetween; and at least part of the transmission is positioned in the space between the first drive wheel and the second drive wheel,
   wherein the transmission comprises an input transmission wheel connected to an output of the motor, an output transmission wheel connected to the first and second drive wheels, and an endless transmission link disposed around the input and output transmission wheels,
   wherein a major portion of the motor is contained within the width of the track and a minor portion of the motor protrudes beyond the track in a widthwise direction of the track system, said minor portion comprising a brake of the motor.

2. The track system of claim 1, wherein an axis of rotation of the drive wheel is spaced apart from an axis of rotation of an output of the motor.

3. The track system of claim 2, wherein the axis of rotation of the drive wheel is spaced apart from the axis of rotation of the output of the motor in a longitudinal direction of the track system.

4. The track system of claim 2, wherein the axis of rotation of the drive wheel is spaced apart from the axis of rotation of the output of the motor in a heightwise direction of the track system.

5. The track system of claim 3, wherein the axis of rotation of the drive wheel is spaced apart from the axis of rotation of the output of the motor in a heightwise direction of the track system.

6. The track system of claim 1, comprising a frame, wherein the motor is affixed to the frame of the track system.

7. The track system of claim 1, wherein at least a majority of the transmission is contained within the width of the track.

8. The track system of claim 7, wherein an entirety of the transmission is contained within the width of the track.

9. The track system of claim 1, wherein the minor portion of the motor is configured to be received in a void of a frame of the vehicle.

10. The track system of claim 1, wherein at least 70% of the dimension of the motor in the widthwise direction of the track system is contained within the width of the track.

11. The track system of claim 1, wherein the transmission is configured to perform a speed conversion such that a rotational speed of the drive wheel is different from a rotational speed of an output of the motor.

12. The track system of claim 11, wherein a transmission ratio of an output rotational speed of the transmission over an input rotational speed of the transmission is no more than 0.7.

13. The track system of claim 1, wherein the brake is disposed in an inboard lateral half of the track system.

14. The track system of claim 1, wherein the inner surface of the carcass comprises a friction drive surface; and the drive wheel comprises a friction drive surface frictionally engaging the friction drive surface of the carcass to frictionally drive the track around the track-engaging assembly.

15. The track system of claim 14, wherein the drive wheel comprises a central member and a peripheral member disposed radially outwardly of the central member and including the friction drive surface; and a coefficient of friction between a material of the peripheral member of the drive wheel and elastomeric material of the track is greater than a coefficient of friction between a material of the central member of the drive wheel and the elastomeric material of the track.

16. The track system of claim 15, wherein the material of the peripheral member of the drive wheel is elastomeric.

17. The track system of claim 14, wherein the second drive wheel comprises a friction drive surface frictionally engaging the friction drive surface of the track to frictionally drive the track around the track-engaging assembly.

18. The track system of claim 1, wherein a diameter of the drive wheel is greater than a diameter of the idler wheel.

19. The track system of claim 1, wherein the idler wheel is a front idler wheel and the track-engaging assembly comprises a plurality of roller wheels disposed between the drive wheel and the front idler wheel in a longitudinal direction of the track system.

20. The track system of claim 1, wherein the track is free of metallic cores embedded in elastomeric material of the track and extending transversally to a longitudinal direction of the track.

* * * * *